(12) United States Patent
Roslak et al.

(10) Patent No.: US 7,959,078 B2
(45) Date of Patent: Jun. 14, 2011

(54) SCANNER WITH EMBEDDED AUDIO/DATA COMMUNICATION SYSTEM

(75) Inventors: Tom Roslak, Northport, NY (US); Nicole Tricoukes, Seaford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 394 days.

(21) Appl. No.: 12/187,080

(22) Filed: Aug. 6, 2008

(65) Prior Publication Data

US 2010/0032481 A1 Feb. 11, 2010

(51) Int. Cl.
*G06K 15/00* (2006.01)

(52) U.S. Cl. ........................................ 235/383; 235/375

(58) Field of Classification Search .................. 235/383, 235/375, 462.46, 472.02
See application file for complete search history.

(56) References Cited

U.S. PATENT DOCUMENTS

| | | | | |
|---|---|---|---|---|
| 6,149,063 A | * | 11/2000 | Reynolds et al. | 235/472.02 |
| 2005/0001036 A1 | * | 1/2005 | Blake et al. | 235/462.37 |
| 2006/0289654 A1 | * | 12/2006 | Robinson et al. | 235/462.46 |
| 2009/0281891 A1 | * | 11/2009 | Walker et al. | 705/14.38 |

* cited by examiner

*Primary Examiner* — Edwyn Labaze (57) ABSTRACT

The invention relates to a scanner with an embedded voice/data communication system. The embedded communication system enables data to obtained remotely, and transferred to the scanner. The scanner includes a multiplexing component that can enables data received via the communication component to be handled as though it were obtained with the scanner. In addition, the communication system enables paging/calling of remote devices.

6 Claims, 8 Drawing Sheets

SCANNER WITH EMBEDDED AUDIO/DATA COMMUNICATION SYSTEM

BACKGROUND

Imaging and communication technologies have experienced significant growth over the past several years. This growth has lead to imaging and communication systems of increased sophistication and complexity. Additionally, the size of packaging for imaging and communication systems is continually decreasing. However, the two technologies have remained largely exclusive of one of another in industrial and retail applications.

Retail operations, industrial sites, and so forth often contain imaging systems for scanning bar codes and data matrices contained on items, packages, products, etc. The imaging systems are often very sophisticated, and offer tremendous data management capabilities. However, the imaging and data management systems are ineffective if the bar code or data matrix is not readily available at the same location where the imaging system is maintained.

The need to have the item within a useful proximity of the imaging systems can result in inefficiencies that the data management systems were designed to overcome. Often an operator is required to contact a third party who is near the item, and manually enter the bar code information. This process can result in a variety of costly and time-consuming errors. Therefore, it would be desirable to have an imaging system that included a communication system, wherein the communication system enabled data transfer between the imaging system and remote devices.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with imaging systems. In accordance with some aspects presented herein, provided is a system that has To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

Figure 1:
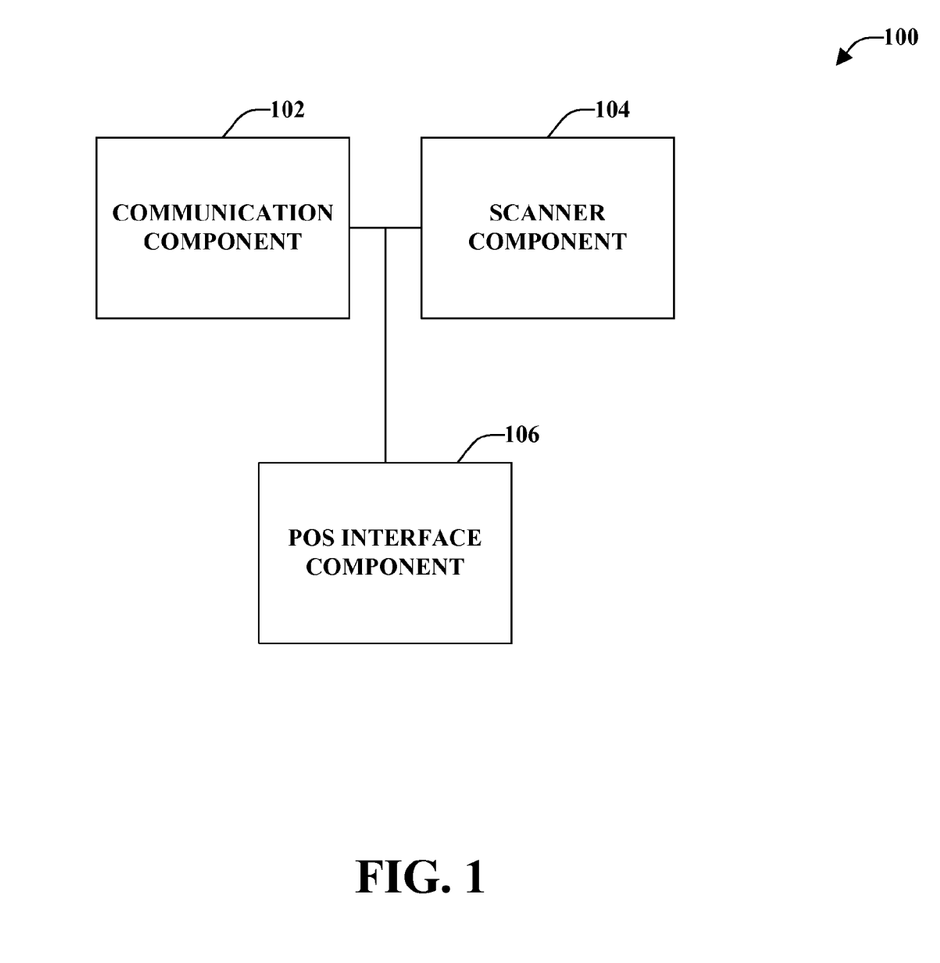
FIG. 1 illustrates a block diagram of a scanner with an embedded voice/data communication system in accordance with an aspect of the present invention.

Referring initially to FIG. 1, illustrated is an exemplary block diagram of a scanner with an embedded audio/data communication system. The system 100 includes a communication component 102, a scanner component 104, and a point of sale (POS) interface component 106. The communication component 102 provides for communication with one or more remote devices (e.g. telephone, internet phone, mobile device, cell phone, smart phone, PDA, laptop, computer, etc.). The communication component 102 can communicate with the remote devices using a communication framework, including but not limited to wireless communication, satellite communication, network communication, telephone communication, voice over internet protocol (e.g. Voice over IP or VoIP), etc. For instance, the communication component 102 can consist of a VoIP phone, which enables audio/data communication with any of a plurality of audio/data communication enabled phones or devices.

The scanner component 104 enables imaging and analysis of one or more data types. It is to be appreciated that the scanner component can be any of a plurality of imaging or scanning systems, such as an imager, a camera, a laser scanner, and so forth. The scanner component 104 captures images via processes and systems that are well known in the art. The scanner component 104 can capture images (e.g. digital, analog, etc.), and store the image via any suitable means, such as a computer readable storage medium. In addition, the scanner component 102 can analyze the captured images. For instance, the scanner component 102 can analyze the captured image to locate an instance of a particular type of data (e.g. machine readable indicia), and subsequently examine the data. Additionally, the scanner component 104 can communicate the data to the communication component 104 and/or the POS interface component 106.

The POS interface 106 provides an interface between the system 100 and a point of sale apparatus or system. For instance, a bar code and/or one or more chunks of data contained in a bar code can be obtained via the scanner component 104, and communicated to a cash register (e.g. point of sale system) via the POS interface 106. The POS interface 106 can format the data for use by the point of sale system, where the point of sale system requires acquired data to conform to a predetermined point of sale schema or structure.

Figure 2:
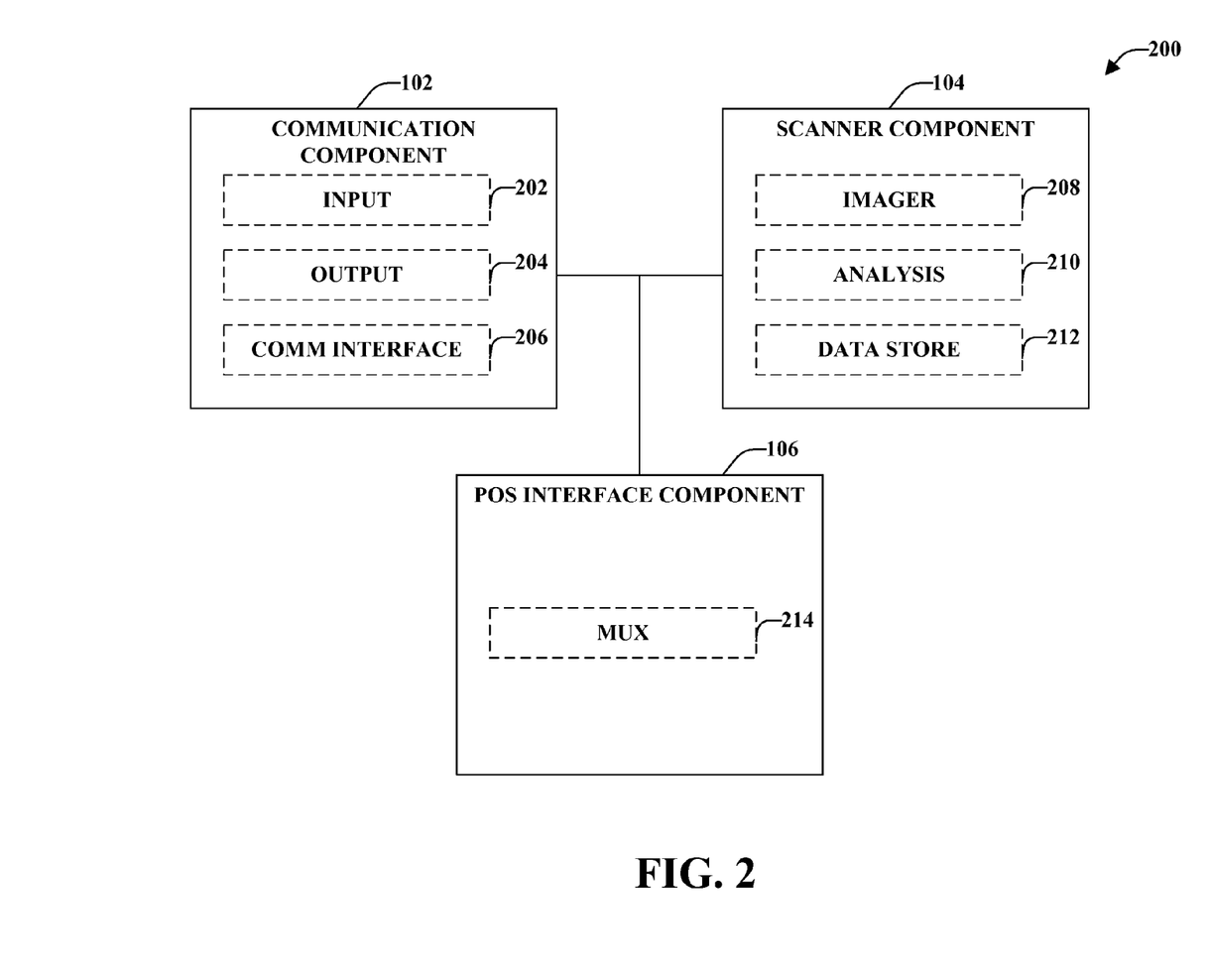
FIG. 2 illustrates a block diagram of a scanner with an embedded voice/data communication system in accordance with an aspect of the present invention.

Referring to FIG. 2, illustrated is an exemplary block diagram of a scanner with an embedded audio/data communication system. The system 200 includes a communication component 102, a scanner component 104, and a point of sale (POS) interface component 106. The communication component 102 includes an input component 202, an output component 204, and a communications interface component 206. The input component 202 can obtain explicit user inputs (e.g., configuration selections, question/answer) such as from keypad selections, touch screen selections, keyboard, mouse, speech, scanner and so forth. For instance, the system 200 can include a numerical keypad and microphone that accepts user input (discussed infra). The output component 204 can provide for outputting audio and/or data to users via a display screen, speaker, and so forth. For instance, the system 200 can include a liquid crystal display (LCD) that exposes one or more interfaces that facilitate displaying data, and a speaker that reproduces audio for users.

The communications interface 206 provides for audio communication and/or data transfer with any of a plurality of remote communications enabled devices (e.g. telephone, internet phone, mobile device, cell phone, smart phone, PDA, laptop, computer, etc.). The communications interface 206 enables communication with the remote devices across a communication framework, such as via voice over Internet protocol (VoIP), and network enabled data transfers. Additionally, the communications interface 206 can transfer/exchange a plurality of data types (e.g. packets, files, images, etc.) with the remote devices through methods and processes that are well known in the art.

The scanner component 104 includes an imager component 208, an analysis component 210, and a data store 212. The imager component 208 captures images using means that are well known in the art. The imager component 208 can capture an image, and store the image via any suitable means, such as a data store 212 (e.g. computer readable storage medium). In addition, the scanner component 104 includes an analysis component 210. The analysis component 210 locates instances of predefined data types in the captured images. The data types can include a plurality of types of machine readable indicia, such as bar codes, data matrices, and so forth. Additionally, the analysis component 210 can analyze or decode the data types. For instance, the analysis component 210 can locate a bar code in a captured image, and decode the bar code to obtain data, such as retail data, identity data, manufacturer data, location data, shipping data, and so forth. Subsequently, the data can be displayed to the user, communicated to another device/system via the communication component 102, or communicated to a point of sale system via the POS component 106 (discussed below).

As previously stated, The POS interface 106 provides an interface between the system 100 and a point of sale apparatus or system (e.g. cash register, price checker, etc.). In addition, the POS interface component 106 includes a multiplexer (MUX) component 214. The MUX component 214 can receive data from the communications component 102 and/or scanner component 104, and communicate the data to the point of sale system. For instance, users can capture an image containing a bar code via the scanner component 104, wherein the scanner component 104 analyzes the image and obtains the data contained in the bar code. In addition, the bar code data can be obtained from a remote communications enabled device via the communications component 102. The MUX component 214 acquires the data (e.g. bar code data) from either the communication component 102 or the scanner component 104. The MUX component 214 can identify the data as a valid data type, and communicate valid data types to the point of sale system. Valid data types are determined as a function of the data types accepted by the point of sale system, and as previously noted the POS interface component 106 can format the data for use with the point of sale system. For instance, the POS interface component 106 can format bar code data to be used by a legacy cash register or checkout system.

Figure 3:
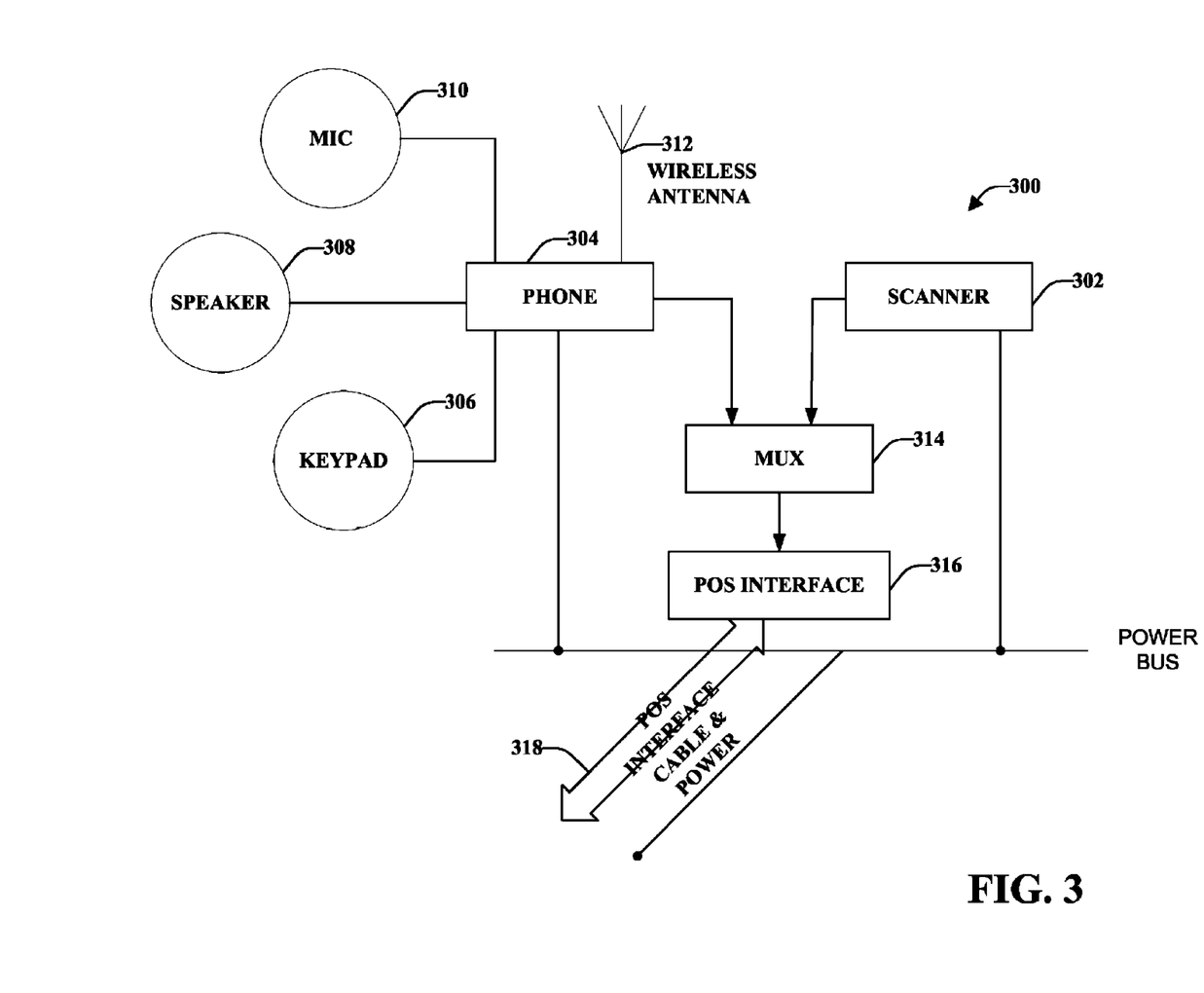
FIG. 3 illustrates a block diagram of a scanner with an embedded voice/data communication system in accordance with an aspect of the present invention.

Referring to FIG. 3, illustrated is an exemplary block diagram of a scanner with an embedded audio/data communication system. The system 300 includes a scanner 302 that captures one or more images, and analyzes the images to determine included data types (e.g. machine readable indicia, bar code, data matrix, etc.). In addition, the scanner 302 can decode the data contained in the captured images (as noted supra).

A phone 304 is coupled with a keypad 306, a speaker 308, a microphone 310, and a wireless antenna 312. The phone 304 is a wireless telephone system capable of communicating with remote devices via a communication framework (e.g. a global communication framework such as the Internet). The wireless antenna 312 facilitates wireless communication via the communication framework, wherein the wireless antenna 312 wirelessly associates the phone with an access point (not shown). The microphone 310 and the speaker 308 facilitate voice communication with the remote devices, wherein the microphone 310 can capture audio data for transmission and the speaker 308 can reproduce audio data received from a remote device. Additionally, the microphone 310 can capture user input for use by the system 300 (e.g. voice dialing). It is to be appreciated that the speaker 308 and microphone 310 can be combined into a single element. The keypad 306 enables users to call or page the remote devices by entering an identifier associated with the remote device (e.g. extension, telephone number, etc.). In addition, the keypad 306 can enable users to access functionality contained in the phone 304, such as contact list, GPS, and so forth.

A multiplexer (MUX) 314 receives data from the scanner 302 and/or phone 304, and can communicate the data to the POS interface 316 (discussed below). The MUX component 314 allows data obtained via the phone 304, from one or more remote devices, to be input into the POS interface 316, and handled in a similar fashion as data obtained via the scanner 302. For instance, a remote device can capture a bar code, and subsequently transmit the bar code to the system 300. The phone 304 receives the bar code from the remote device and communicates the bar code to the MUX 314. The MUX 314 can analyze the bar code to ensure it is a valid data type (previously discussed), and communicate the bar code to the POS interface 316. Additionally or alternatively, users can capture an image containing a bar code via the scanner 302, wherein the scanner 302 communicates the bar code data to the POS interface 316 via the MUX 314.

The POS interface 316 provides for an interface between the system 300 and a point of sale device (POS device), such as a cash register, price checker, and so forth. The POS interface 316 can include an interface cable 318. The interface cable 318 provides a physical connection between the POS interface 316 and the POS device. The POS interface cable 318 can include a set of connection points (e.g. proprietary or customized wiring harness) necessary to connect the system 300 to the POS device.

Figure 4:
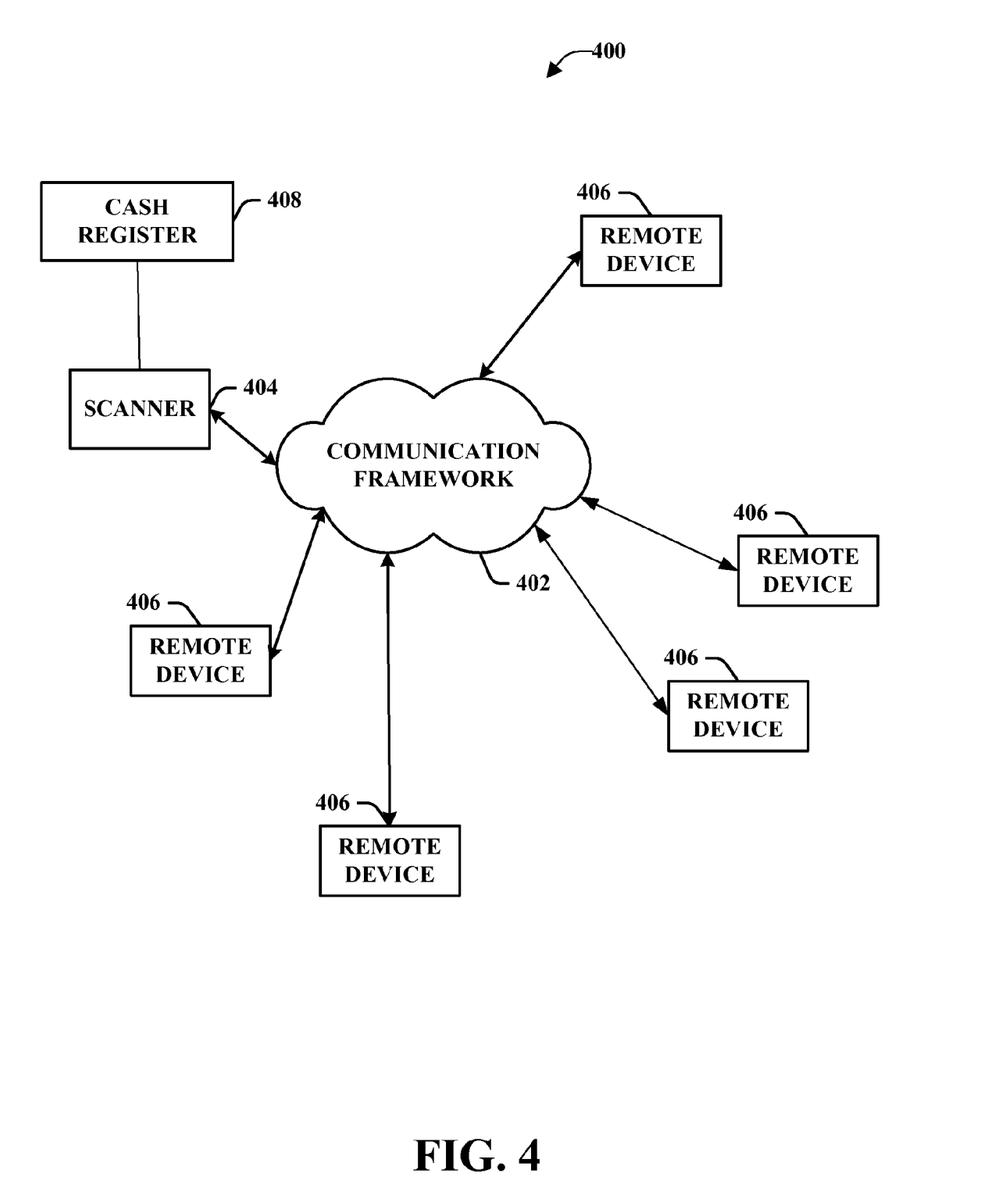
FIG. 4 illustrates an exemplary application a scanner with an embedded voice/data communication system in accordance with an aspect of the present invention.

Referring now to FIG. 4, an exemplary application of scanner with an embedded voice/data communication system is shown. The system 400 includes a communication framework 402 (e.g. a global framework such as the Internet, a LAN, a WLAN, wireless communication framework, telephone communication framework, etc.), a scanner with an embedded voice/data communication system (scanner) 404, and a plurality of remote devices 406. The scanner 404 can communicate with one or more remote devices 406 via the communication framework 402 (discussed supra). For instance, the scanner 402 can page or call a remote device 406 to initiate an audio exchange, wherein the scanner 402 user may describe a product for which they need a bar code. Additionally or alternatively, the scanner 402 and remote devices 406 can transmit data via the communication framework 402. For instance, a remote device 406 can obtain an image of a product and transmit the image to the scanner 404, wherein the scanner 404 or an associated device can be used to view the image and verify the product's identity. In addition, the remote device 406 can capture one or more bar codes and transmit the bar code to the scanner 404. As previously discussed, the scanner 404 can receive the bar code, verify that the bar code is a valid data type, format the bar code data if necessary, and communicate the bar code to a cash register 408.

Figure 5:
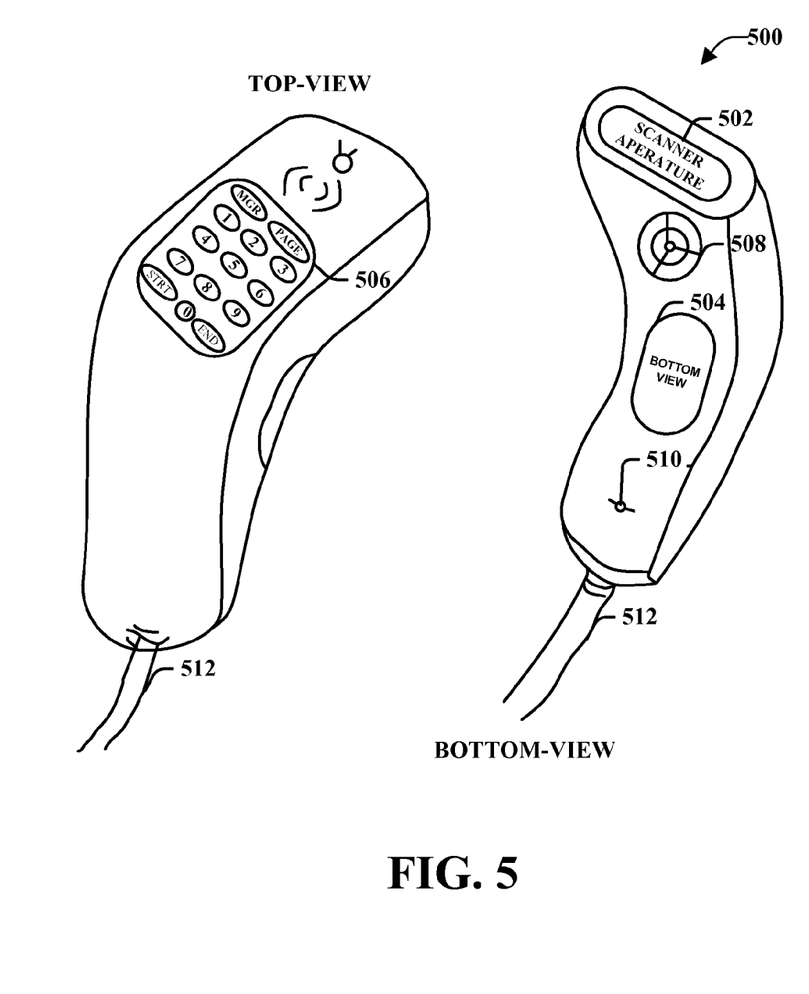
FIG. 5 illustrates an exemplary embodiment of a scanner with an embedded voice/data communication system in accordance with an aspect of the present invention.

Referring to FIG. 5 an exemplary embodiment of a scanner with an embedded voice/data communication system is shown. The device 500 includes a scanner 502 and a trigger 504. As previously discussed, the scanner 502 can capture one or more images. In addition, the scanner 502 can analyze the images for desired data types, and decode information contained in the data types. The scanner 502 captures the images when the trigger 504 is operated. The device 500 further includes a keypad 506, a speaker 508, and a microphone 510. The keypad 506, speaker 508, and microphone 510 are associated with an embedded voice/data communication system (not shown), such as a VoIP phone. The keypad 506 can be used to contact one or more remote devices by dialing an identifier unique to the remote device (e.g. extension, telephone number, etc.). Additionally, the keypad 506 can provide access to functionality included in the device, such as manually entering a bar code, serial number, etc. The speaker 508 and microphone 510 can be used in audio communication as previously discussed. In addition, the device 500 includes a POS interface cable 512 that provides a wired connection to a point of sale device, such as a cash register. As discussed supra, the device 500 can scan data or obtain data from a remote device, and communicate the data to a point of sale device.

Figure 6:
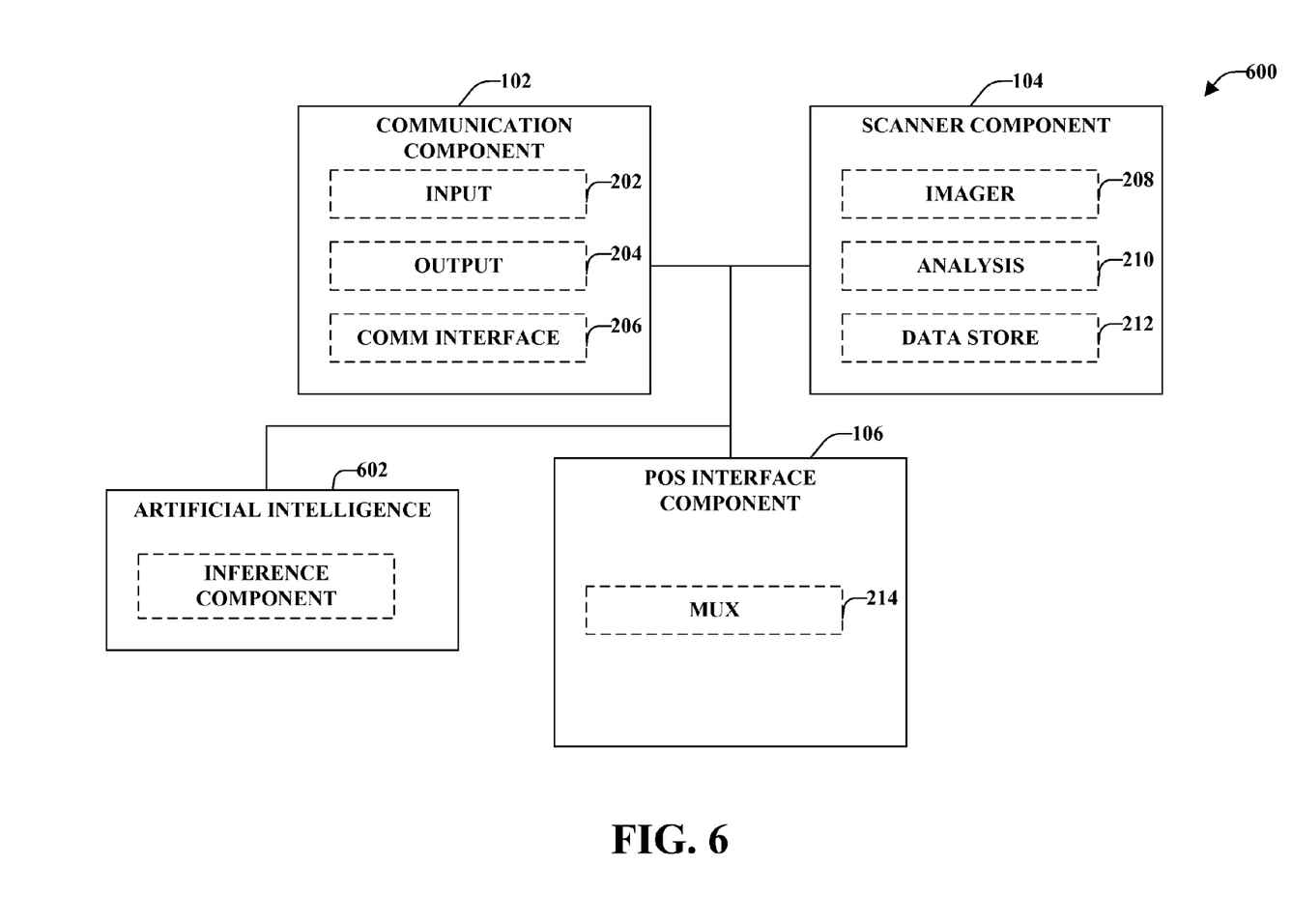
FIG. 6 illustrates a system that employs an artificial intelligence component that facilitates automating one or more features in accordance with the subject invention.

FIG. 6 illustrates a system 600 that employs an artificial intelligence (AI) component 602 that facilitates automating one or more features in accordance with the subject invention. The subject invention (e.g., in connection with inferring) can employ various AI-based schemes for carrying out various aspects thereof. For example, a process for multiplexing data received from the communications component 102 and scanner component 104 can be facilitated via an automatic classifier system and process.

A classifier is a function that maps an input attribute vector, x=(x1, x2, x3, x7, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., nayve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 7:
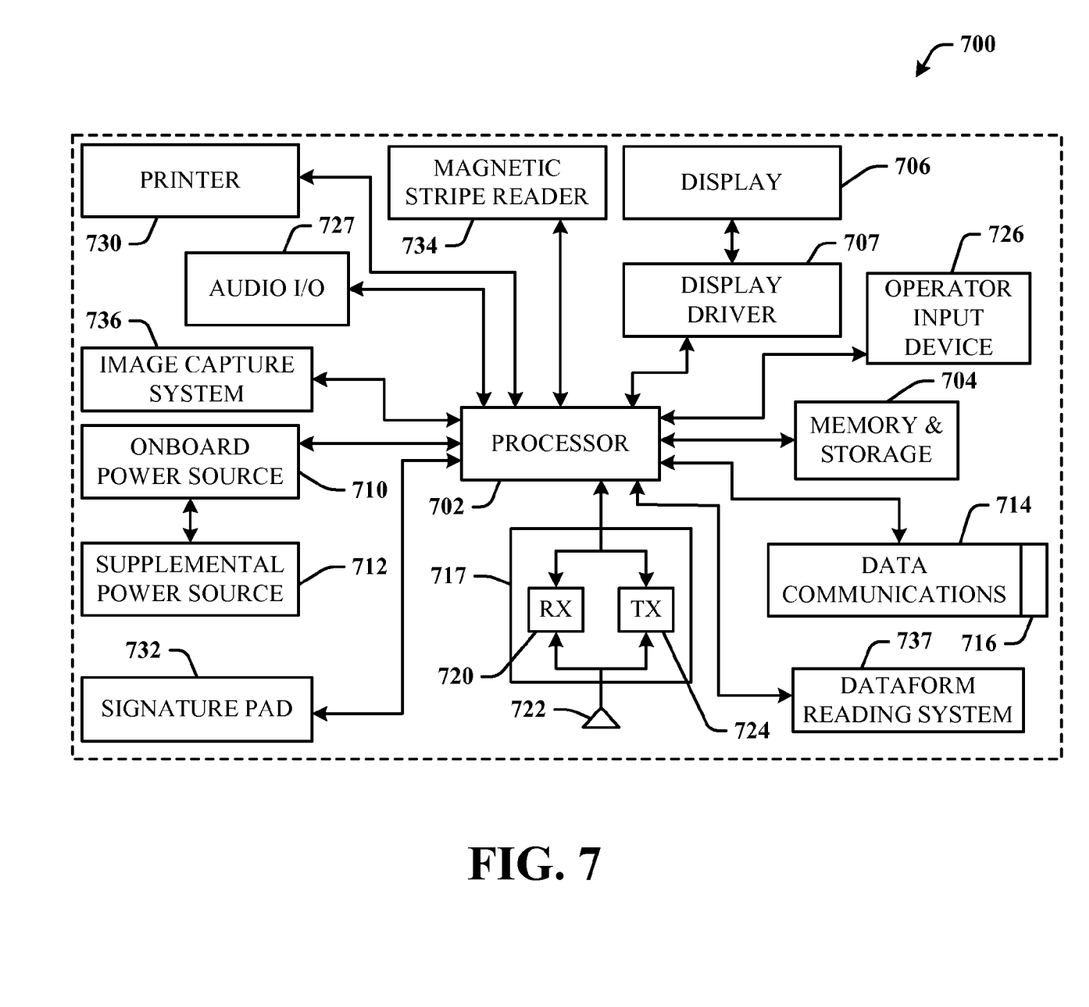
FIG. 7 illustrates an exemplary device operative to execute the one or more embodiments disclosed herein.

Referring now to FIG. 7, illustrated is a schematic block diagram of a portable hand-held terminal device 700 according to one aspect of the invention, in which a processor 702 is responsible for controlling the general operation of the device 700. The processor 702 is programmed to control and operate the various components within the device 700 in order to carry out the various functions described herein. The processor 702 can be any of a plurality of suitable processors. The manner in which the processor 702 can be programmed to carry out the functions relating to the invention will be readily apparent to those having ordinary skill in the art based on the description provided herein.

A memory 704 connected to the processor 702 serves to store program code executed by the processor 702, and serves as a storage means for storing information such as user credential and receipt transaction information and the like. The memory 704 can be a nonvolatile memory suitably adapted to store at least a complete set of the information that is displayed. Thus, the memory 704 can include a RAM or flash memory for high-speed access by the processor 702 and/or a mass storage memory, e.g., a micro drive capable of storing gigabytes of data that comprises text, images, audio, and video content. According to one aspect, the memory 704 has sufficient storage capacity to store multiple sets of information, and the processor 702 could include a program for alternating or cycling between various sets of display information.

A display 706 is coupled to the processor 702 via a display driver system 708. The display 706 can be a color liquid crystal display (LCD), plasma display, or the like. In this example, the display 706 is a ¼ VGA display with sixteen levels of gray scale. The display 706 functions to present data, graphics, or other information content. For example, the display 706 can display a set of customer information, which is displayed to the operator and can be transmitted over a system backbone (not shown). Additionally, the display 706 can display a variety of functions that control the execution of the device 700. The display 706 is capable of displaying both alphanumeric and graphical characters.

Power is provided to the processor 702 and other components forming the hand-held device 700 by an onboard power system 710 (e.g., a battery pack). In the event that the power system 710 fails or becomes disconnected from the device 700, a supplemental power source 712 can be employed to provide power to the processor 702 and to charge the onboard power system 710. The processor 702 of the device 700 induces a sleep mode to reduce the current draw upon detection of an anticipated power failure.

The terminal 700 includes a communication subsystem 714 that includes a data communication port 716, which is employed to interface the processor 702 with a remote computer. The port 716 can include at least one of Universal Serial Bus (USB) and IEEE 1394 serial communications capabilities. Other technologies can also be included, for example, infrared communication utilizing an infrared data port.

The device 700 can also include a radio frequency (RF) transceiver section 718 in operative communication with the processor 702. The RF section 718 includes an RF receiver 720, which receives RF signals from a remote device via an antenna 722 and demodulates the signal to obtain digital information modulated therein. The RF section 718 also includes an RF transmitter 724 for transmitting information to a remote device, for example, in response to manual user input via a user input device 726 (e.g., a keypad) or automatically in response to the completion of a transaction or other predetermined and programmed criteria. The transceiver section 718 facilitates communication with a transponder system, for example, either passive or active, that is in use with product or item RF tags. The processor 702 signals (or pulses) the remote transponder system via the transceiver 718, and detects the return signal in order to read the contents of the tag memory. In one implementation, the RF section 718 further facilitates telephone communications using the device 700. In furtherance thereof, an audio I/O section 728 is provided as controlled by the processor 702 to process voice input from a microphone (or similar audio input device) and audio output signals (from a speaker or similar audio output device).

In another implementation, the device 700 can provide voice recognition capabilities such that when the device 700 is used simply as a voice recorder, the processor 702 can facilitate high-speed conversion of the voice signals into text content for local editing and review, and/or later download to a remote system, such as a computer word processor. Similarly, the converted voice signals can be used to control the device 700 instead of using manual entry via the keypad 726.

Onboard peripheral devices, such as a printer 730, signature pad 732, and a magnetic strip reader 734 can also be provided within the housing of the device 700 or accommodated externally through one or more of the external port interfaces 716.

The device 700 can also include an image capture system 736 such that the user can record images and/or short movies for storage by the device 700 and presentation by the display 706. Additionally, a dataform reading system 738 is included for scanning dataforms. It is to be appreciated that these imaging systems (736 and 738) can be a single system capable of performing both functions.

Figure 8:
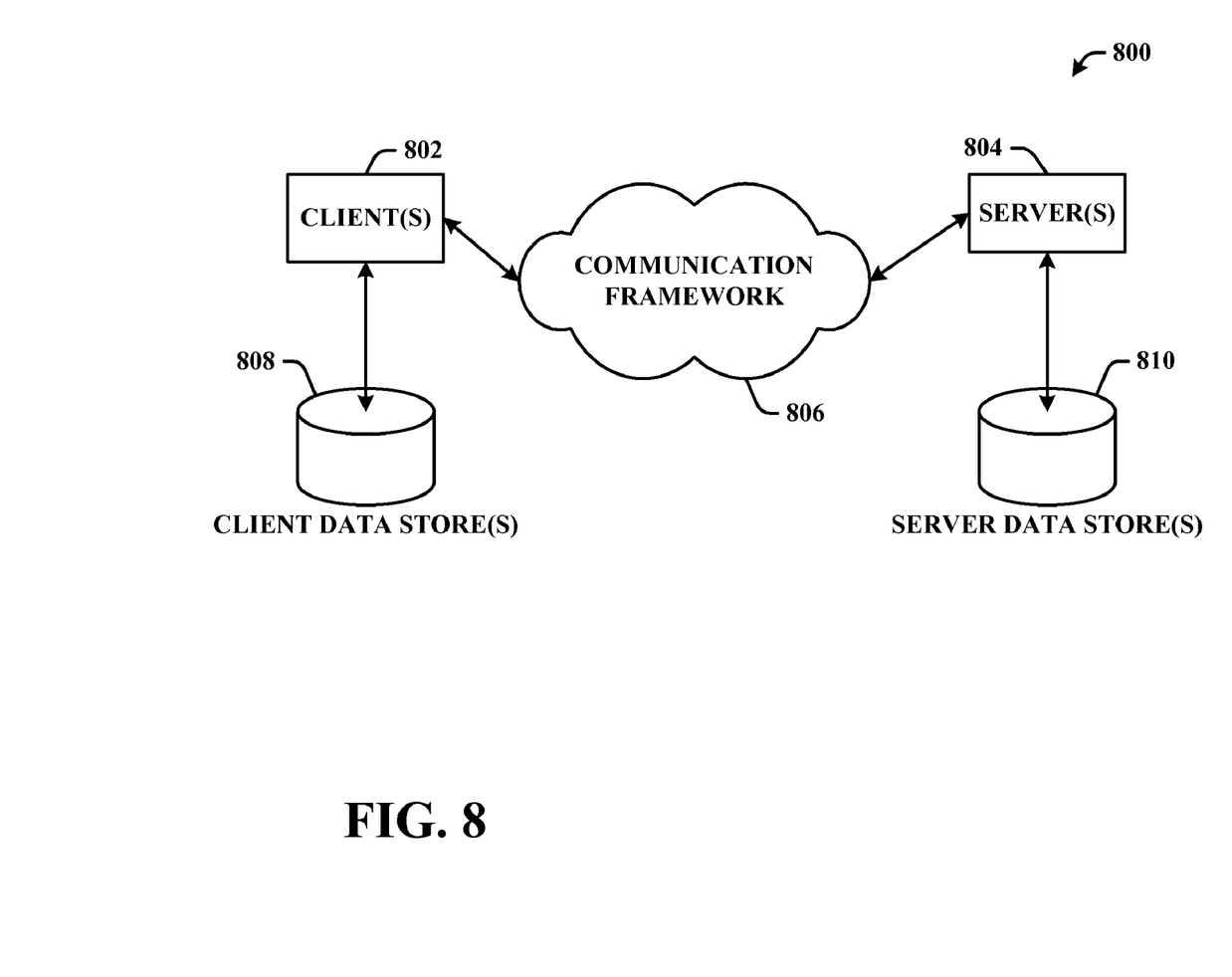
FIG. 8 is a schematic block diagram of a sample-computing environment with which the subject invention can interact.

Referring now to FIG. 8, there is illustrated a schematic block diagram of an exemplary computing environment 800 in accordance with the subject invention. The system 800 includes one or more client(s) 802. The client(s) 802 can be hardware and/or software (e.g., threads, processes, computing devices). The client(s) 802 can house cookie(s) and/or associated contextual information by employing the invention, for example.

The system 800 also includes one or more server(s) 804. The server(s) 804 can also be hardware and/or software (e.g., threads, processes, computing devices). The servers 804 can house threads to perform transformations by employing the invention, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An image capture and communication system, comprising:
    a scanner component that captures an image of machine readable indicia containing informational data and decodes the informational data contained in the captured image;
    a communication component that enables communication with a remote device, wherein communication with the remote device enables data transfer of informational data from the remote device; and
    a point of sale interface (POS) component that receives the informational data from either the scanner component or the communication component, the POS interface component includes a multiplexer (MUX) component that identifies data obtained by the POS interface, handles informational data from the communication component the same as informational data from the scanner component, verifies the data is of a valid data type, and communicates the informational data to a point of sale device.

2. The system of claim 1, wherein the valid data types are determined as a function of the input data types received by the point of sale device.

3. An image capture and communication system, comprising:
    means for scanning an image of machine readable indicia containing informational data and decoding the informational data contained in the captured image;
    means for communicating with a remote device, formatting informational data from the remote device for use by the point of sale device, and transferring the information data from the remote device;
    means for multiplexing and identifying informational data from either the means for scanning or the means for communicating, wherein the means for multiplexing and identifying handles informational data from the communication component the same as informational data from the scanner component, and verifies the data is of a valid data type; and
    means for communicating the informational data to a point of sale device.

4. The system of claim 3, wherein the valid data types are determined as a function of the input data types received by the point of sale device.

5. A scanner with an embedded communication system, comprising:
    a scanner that captures and decodes machine readable indicia containing informational data;
    a communication component that enables communication with a remote device, the communication enabling at least one of audio conversation with and data transfer of informational data from the remote device; and
    a point of sale interface (POS) component that receives the informational data from either the scanner component or the communication component, the POS interface component includes a multiplexer (MUX) component that identifies data obtained by the POS interface, formats the informational data for use by a computer, handles informational data from the communication component the same as informational data from the scanner component, verifies the data is of a valid data type for use by the computer, and communicates the informational data to the computer.

6. The system of claim 5, wherein a valid data type is data that can be used by the computer.

* * * * *